United States Patent
Doong

(10) Patent No.: US 10,821,394 B2
(45) Date of Patent: *Nov. 3, 2020

(54) TEMPERATURE SWING ADSORPTION PROCESS FOR HEAVY HYDROCARBON REMOVAL

(71) Applicant: UOP LLC, Des Plaines (IL)

(72) Inventor: Shain-Jer Doong, Kildeer, IL (US)

(*) Notice: Subject to any disclaimer, the term of this patent is extended or adjusted under 35 U.S.C. 154(b) by 234 days.

This patent is subject to a terminal disclaimer.

(21) Appl. No.: 16/013,747

(22) Filed: Jun. 20, 2018

(65) Prior Publication Data

US 2019/0388828 A1 Dec. 26, 2019

(51) Int. Cl.
| | | |
|---|---|---|
| *B01D 53/04* | (2006.01) | |
| *B01D 3/14* | (2006.01) | |
| *B01D 46/00* | (2006.01) | |
| *C10L 3/10* | (2006.01) | |

(52) U.S. Cl.
CPC ......... *B01D 53/0462* (2013.01); *B01D 3/143* (2013.01); *B01D 46/003* (2013.01); *C10L 3/101* (2013.01); *B01D 2257/702* (2013.01); *B01D 2259/401* (2013.01); *C10L 2290/06* (2013.01); *C10L 2290/12* (2013.01); *C10L 2290/542* (2013.01)

(58) Field of Classification Search
CPC ...... B01D 3/143; B01D 46/003; B01D 53/04; B01D 53/0462; B01D 2257/702; B01D 2259/401; C10L 3/101; C10L 2290/06; C10L 2290/10; C10L 2290/12; C10L 2290/542
USPC .... 95/114, 115, 143, 148; 96/121, 126, 134, 96/143, 146; 585/800, 820, 833
See application file for complete search history.

(56) References Cited

U.S. PATENT DOCUMENTS

| | | | | |
|---|---|---|---|---|
| 3,479,797 A | * | 11/1969 | Greathouse | ................ F25J 5/00 95/146 |
| 3,527,024 A | * | 9/1970 | Loomer | ................... C10G 5/02 95/115 |
| 3,540,188 A | * | 11/1970 | Barrere, Jr. | ........ B01D 53/0454 95/12 |

(Continued)

FOREIGN PATENT DOCUMENTS

WO   2003078029 A1   9/2003

OTHER PUBLICATIONS

International Search Report for corresponding International Applicatoin PCT/US2019/038005 dated Oct. 3, 2019 includes UOP SeparSIVTM System for Lean Natural Gas Processing (UOP 4524-21), Mar. 2014, UOP LLC, brochure, p. 1-2.

*Primary Examiner* — Frank M Lawrence, Jr.

(57) ABSTRACT

A process is provided to treat a natural gas stream by removing heavier hydrocarbons comprising C5, C6 and heavier hydrocarbons. The process involves sending a natural gas stream through an adsorbent bed to remove heavier hydrocarbons and producing a product stream comprising C1 to C4 hydrocarbons. A portion of the product stream is sent through a regeneration heater to produce a heated regeneration gas stream which is sent through the adsorbent bed to desorb the heavier hydrocarbons. Then the regeneration gas stream is cooled and sent to a separation unit such as a distillation column to divide the regeneration gas stream into a liquid stream comprising heavier hydrocarbons and a recovered regeneration gas stream.

11 Claims, 4 Drawing Sheets

(56) References Cited

U.S. PATENT DOCUMENTS

| | | | | |
|---|---|---|---|---|
| 3,713,272 | A | * | 1/1973 | Barrere, Jr. ............ B01D 53/04 95/126 |
| 4,421,532 | A | * | 12/1983 | Sacchetti ............... B01D 53/04 95/104 |
| 10,399,007 | B2 | * | 9/2019 | Doong ............... B01D 53/0462 |
| 2013/0192299 | A1 | * | 8/2013 | Dolan ................. B01D 53/047 62/636 |
| 2018/0017319 | A1 | | 1/2018 | Mak et al. |
| 2018/0126299 | A1 | | 5/2018 | Doong et al. |

* cited by examiner

TEMPERATURE SWING ADSORPTION PROCESS FOR HEAVY HYDROCARBON REMOVAL

BACKGROUND OF THE INVENTION

The invention relates to a process for treating a natural gas feed to remove heavy hydrocarbons and aromatic compounds without removing lighter hydrocarbons. More specifically, the invention provides a process that significantly reduces the energy requirement for removing heavy hydrocarbons from natural gas feeds.

The process that has been developed to remove heavy hydrocarbons (C5 and higher) is based on the principle that adsorbents are capable of selectively adsorbing impurities. The impurities are adsorbed at low temperatures in a fixed-bed adsorber and desorbed by "swinging" the adsorbers from feed gas temperature (low) to regeneration temperatures (high) with hot regeneration gas. Furthermore, with a proper portfolio of adsorbents, multiple impurities can be removed and recovered within a single system.

Typically, the treated gas remains close to feed gas pressure and the hydrocarbons and water are recovered as liquids during regeneration.

SUMMARY OF THE INVENTION

A process is provided to treat a natural gas stream by removing heavier hydrocarbons comprising C5, C6 and heavier hydrocarbons. The process involves sending a natural gas stream through an adsorbent bed to remove heavier hydrocarbons and producing a product stream comprising C1 to C4 hydrocarbons. A portion of the product stream is sent through a regeneration heater to produce a heated regeneration gas stream which is sent through the adsorbent bed to desorb the heavier hydrocarbons. Then the regeneration gas stream is cooled and sent to a separation unit such as a distillation column to divide the regeneration gas stream into a liquid stream comprising heavier hydrocarbons and a recovered regeneration gas stream.

DETAILED DESCRIPTION OF THE INVENTION

An temperature swing adsorption process such as UOP's SeparSIV process has been used as a liquefied natural gas (LNG) pretreatment solution to remove heavy hydrocarbons from a lean natural gas. An adsorbent bed is used to remove these heavy hydrocarbons followed by the use of a regeneration gas stream to regenerate the adsorbent bed. One of the challenging issues in using a thermal swing adsorption process is that a chilling means is still needed to cool and condense the heavy hydrocarbons from the spent regeneration gas stream. If the product specification requires the removal of lighter compounds such as C5 or C6 hydrocarbons, a much colder chilling temperature is generally needed to condense these lighter components. Without sufficient condensing these C5 and C9 hydrocarbons, they will be recycled back to the feed that is sent to the adsorbent bed, and eventually increase the load level of the adsorbent bed as these components start to accumulate in a closed-loop regeneration circuit. While a chilling means such as refrigeration equipment is generally available in a LNG complex, it still accounts for significant utility consumption for the adsorption process due to the additional power consumption from the refrigeration compressor. There still exists a need to develop a better solution to remove these hydrocarbons without incurring significant power consumption costs from the regeneration gas chiller.

Figure 1:
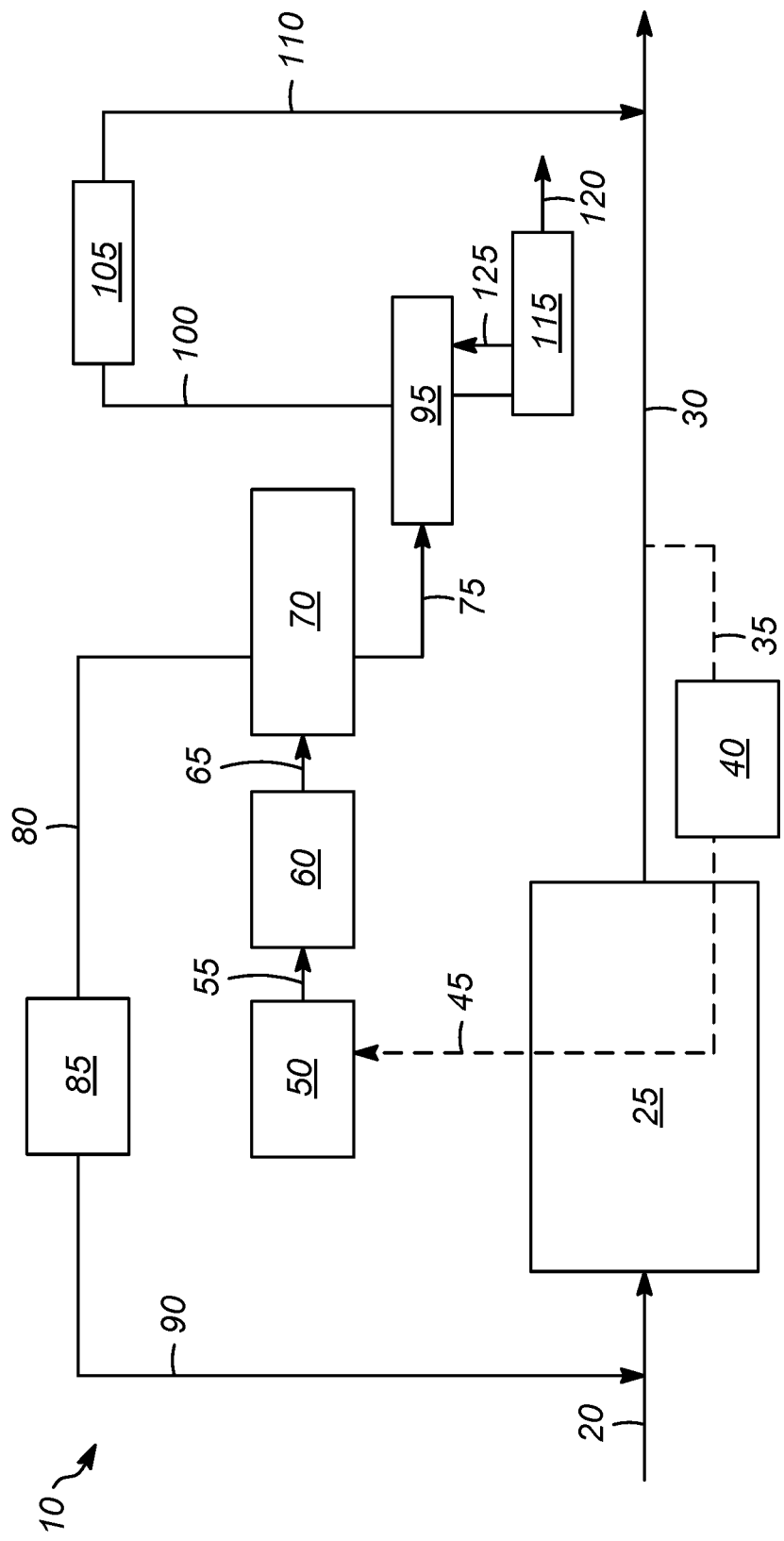
FIG. 1 shows a prior art flow scheme to remove heavy hydrocarbons from a natural gas stream.
Figure 2:
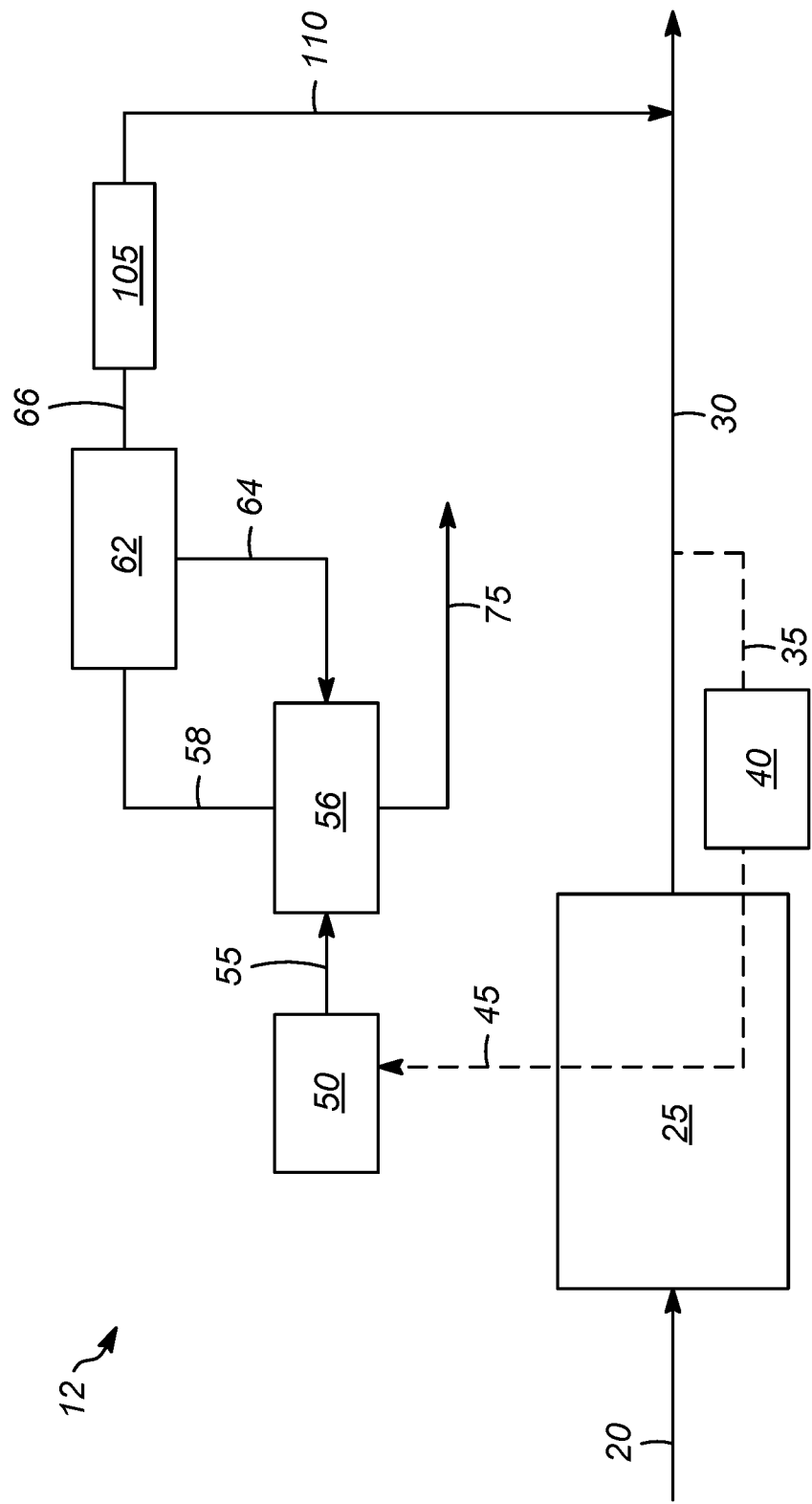
FIG. 2 shows a flow scheme to remove heavy hydrocarbons that uses a refluxed absorber to separate heavy hydrocarbons from lighter hydrocarbons.

FIG. 1 shows a conventional prior art flow scheme for using temperature swing adsorption to remove heavy hydrocarbons from a lean natural gas feed. The hot spent regeneration gas coming out of the adsorber is first cooled by an air cooler before sent to a chiller. The chiller temperature can typically range from 10 to −40 C. A gas-liquid separator is then used to remove the condensed liquid. The noncondensable gas is then returned back to the feed via a blower. Due to the use of a very low chilling temperature, the condensed liquid may contain some light hydrocarbons, such as C1 to C4, which are not meant to be removed from the gas feed. Consequently, a stabilizer is used to further process the liquid and recover these light hydrocarbons. In this invention, a fractionation column is used to separate the heavy components C5+ from the lighter ones, C1 to C4 in the spent regeneration gas. As shown in FIG. 2, the spent regeneration gas is first cooled by an air cooler before being sent to a fractionation column, a reflux absorber in this embodiment of the invention. A chiller/condenser is used as in any distillation column to provide the reflux. The much improved separation achieved by the reflux absorber as compared to the previous design allows the column's residue gas to be sent to the product stream, instead of being recycled back to the feed, because the residue gas already meets the product specification. A blower/compressor is needed to send the residue gas to the product stream, as the column tends to operate at a reduced pressure.

Figure 3:
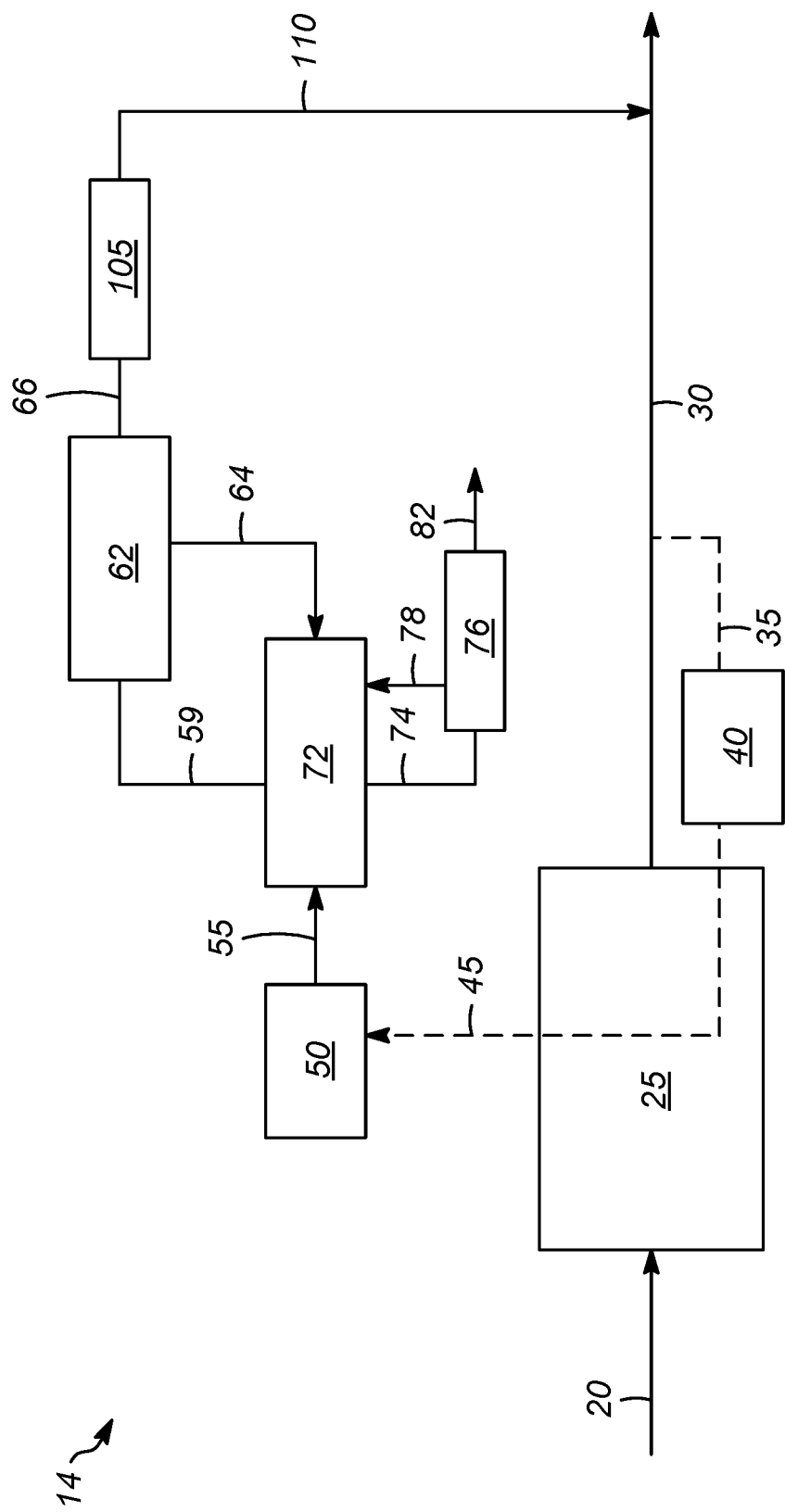
FIG. 3 shows a flow scheme to remove heavy hydrocarbons that uses a distillation column to separate heavy hydrocarbons from lighter hydrocarbons.
Figure 4:
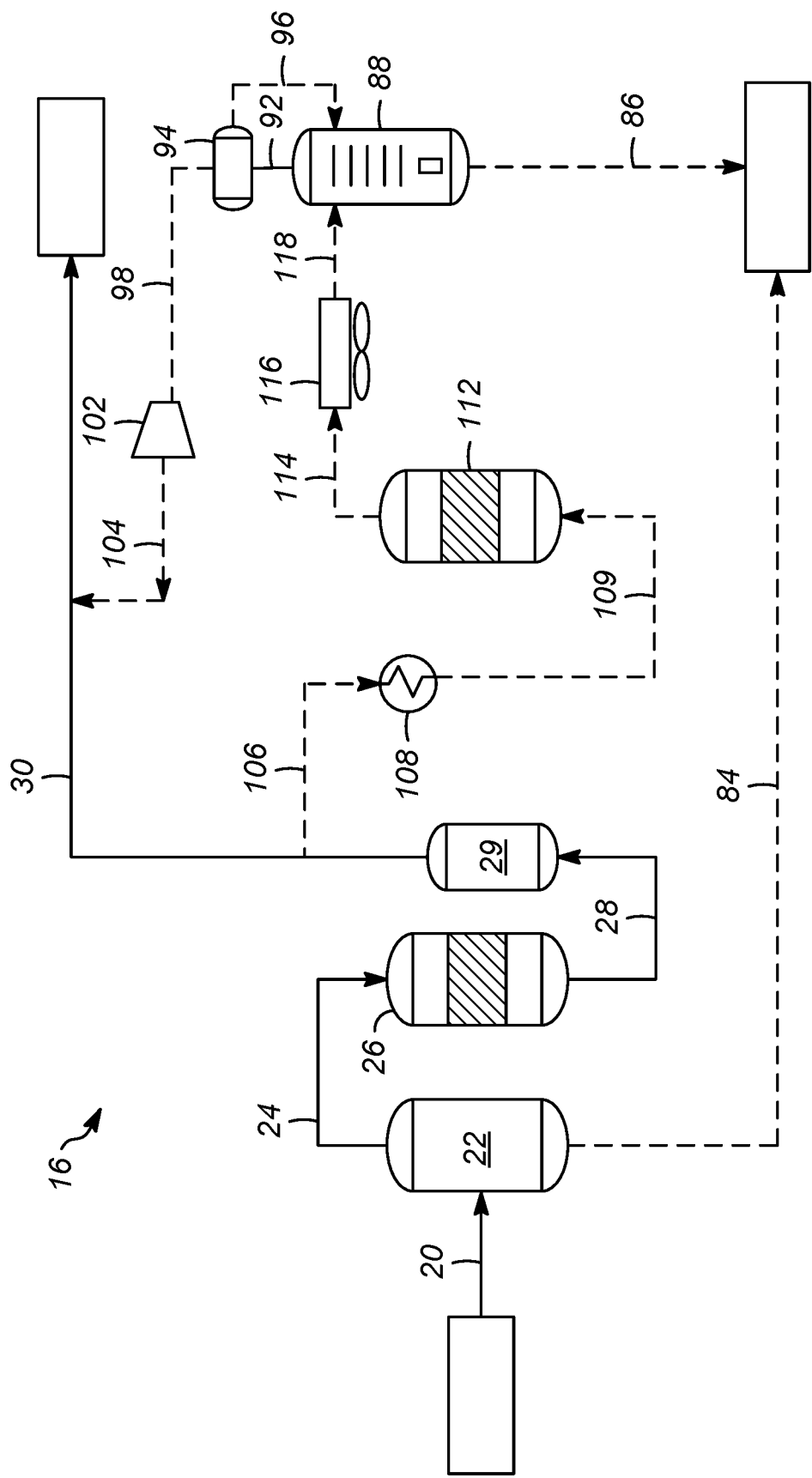
FIG. 4 is a schematic that shows the process for separating a gas containing lighter hydrocarbons from a liquid containing heavier hydrocarbons.

FIG. 3 shows another embodiment of this invention, where instead of a refluxed absorber, a reboiler can also be added to the column to further improve the separation of hydrocarbon components. This scheme allows the distillation column to operate at a slightly higher pressure than the flow scheme in FIG. 2, which lowers the blower/compressor duty. FIG. 4 is a schematic showing the adsorption process integrated with a reflux absorber in the regeneration stream.

More specifically, FIG. 1 is shown a prior art adsorbent system 10 to treat a gas feed 20 which is sent to adsorbent unit 25 to remove impurities producing product stream 30. A portion (regeneration gas) 35 of product stream 30 is sent to regeneration heater 40 and then used to regenerate adsorbent unit 25 by removing impurities. A stream 45 containing impurities is cooled first by air cooler 50 and then cooled stream 55 is chilled in chiller 60 with chilled stream 65 sent to gas/liquid separator 70. A liquid stream 75 is sent to stabilizer 95 with gas 100 sent to blower 105 to line 110 and combined with product stream 30. Also exiting stabilizer 95 is a liquid stream to reboiler 115 with a portion 125 returned to stabilizer 95 and the remainder in stream 120. The gas 80 from gas/liquid separator 70 is sent to blower 85 to line 90 and returned to feed 20.

In FIG. 2 is shown an adsorbent system 12 to treat a gas feed 20 which is sent to adsorbent unit 25 to remove heavier hydrocarbons producing product stream 30. A portion 35 (regeneration gas) of product stream 30 is sent to regeneration heater 40 and then used to regenerate adsorbent unit 25 by removing the heavier hydrocarbons. A stream 45 containing heavier hydrocarbons is cooled first by air cooler 50 and then cooled stream 55 is sent to refluxed absorber 56. A liquid stream 75 that contains most of the heavy hydrocarbons exits the system. An upper gas stream 58 is then sent to chiller/condenser 62 to produce a liquid stream 64 that is returned to refluxed absorber 56 and a gas stream 66 sent to blower 105 and then recovered regeneration gas 110 is combined with product stream 30.

In FIG. 3 is shown an adsorbent system 14 to treat a gas feed 20 which is sent to adsorbent unit 25 to remove impurities producing product stream 30. A portion 35 (regeneration gas) of product stream 30 is sent to regeneration heater 40 and then used to regenerate adsorbent unit 25 by removing heavier hydrocarbons. A stream 45 containing heavier hydrocarbons is cooled first by air cooler 50 and then cooled stream 55 is sent to distillation column 72. A liquid stream 74 is sent to reboiler 76 with liquid stream 82 exiting the system and a lighter stream 78 returning to distillation column 72. A gas stream 59 exits the top of distillation column 72 and is then chilled in chiller/condenser 62 with a liquid stream 64 returning to distillation column 72. Gas stream 66 is sent to blower 105 and the recovered regeneration gas 110 is combined with product stream 30.

FIG. 4 shows another version of the system in FIG. 2 with a reflux absorber. In FIG. 4 is shown an adsorbent system 16 to treat a gas feed 20 which is sent to a filter coalesce 22 to produce a stream 24 that goes to adsorbent unit 26 to remove impurities producing a stream 28 that is sent to a particle filter 29 and then a product gas stream 30 that is a cleaned gas stream. In the schematic of FIG. 4, is shown both an adsorbent bed 26 in adsorbing mode and a regenerating bed 112 in regenerating mode. A portion 106 (regeneration gas) of product stream 30 is sent to regeneration heater 108 and then used to regenerate bed 112 to remove heavier hydrocarbons. A stream 114 containing heavier hydrocarbons is cooled first by regeneration gas cooler 116 and then cooled stream 118 is sent to reflux absorber 88. A liquid stream 86 is combined with liquid stream 84 and exits the system. An upper gas stream 92 is then sent to chiller/condenser 94 to produce a liquid stream 96 that is returned to refluxed absorber 88 and a gas stream 98 sent to blower 102 and then recovered regeneration gas 104 is combined with product stream 30.

EXAMPLE

A natural gas stream at a flow rate of 693 MMSCFD at 67 bar and 17° C. with the following composition: N2: 0.4%, C1: 94.13%, C2: 3.6%, C3: 1.14%, C4: 0.46%, C5: 0.16%, C6: 0.05%, C7: 0.027% and the balance of C8+ hydrocarbons was used. The product specification requires the gas product stream to have C8+<1 ppm, C7<30 ppm, and C6<130 ppm. Honeywell's UniSim software was used to create simulations were performed based on the three flow schemes shown in FIG. 1 (prior art), and FIGS. 2 and 3 of the present invention. All three simulated cases used the same thermal swing cycle, same amount of adsorbents, same reg. gas cooling temperature at −40 C and all three simulated cases meeting the required product specification. Slightly longer cycle time can be used for the flow schemes of FIGS. 2 and 3 and still meet the product specification. The Table shows the comparison of the power consumption as well as additional information about the process. A major saving of power consumption for the two invented flow schemes comes from the lower chiller duty, which results in a reduced compressor power consumption required. Additional benefits of the invention include lower regeneration flow, lower required heater duty, lower air cooler duty, and lower adsorber bed pressure drop (no recycled gas flow added to the feed).

TABLE

|  | Adsorbent Bed with Chiller/ Stabilizer | Adsorbent Bed with Reflux Absorber | Adsorbent Bed with Distillation Column |
|---|---|---|---|
| Feed flow, mmscfd | 693 | 693 | 693 |
| Thermal regeneration time, min | 45 | 48 | 48 |
| Chiller/condenser temperature ° C. | −40 | −40 | −40 |
| Number of beds | 4 | 4 | 4 |
| Regeneration flow mmscfd | 63 | 58 | 58 |
| Heater duty, MMBtu/h | 39 | 36 | 36 |
| Blower power hp | 91 | 385 | 385 |
| Chiller duty MMBtu/h | 15 | 11.4 | 11.8 |
| Chiller compressor power hp | 3640 | 2767 | 2864 |
| Total power hp | 3731 | 3152 | 3149 |

Specific Embodiments

While the following is described in conjunction with specific embodiments, it will be understood that this description is intended to illustrate and not limit the scope of the preceding description and the appended claims.

A first embodiment of the invention is a process to treat a natural gas stream by removing heavier hydrocarbons comprising C5, C6 and heavier hydrocarbons, the process comprising sending the natural gas stream through an adsorbent bed to remove the heavier hydrocarbons and producing a product stream comprising C1 to C4 hydrocarbons; sending a portion of the product stream through a regeneration heater to produce a heated regeneration gas stream; sending the heated regeneration gas stream through the adsorbent bed to desorb the heavier hydrocarbons; and cooling the regeneration gas stream and sending a cooled regeneration gas stream to a separation unit to divide the regeneration gas stream into a liquid stream comprising heavier hydrocarbons and a recovered regeneration gas stream. An embodiment of the invention is one, any or all of prior embodiments in this paragraph up through the first embodiment in this paragraph wherein the separation unit comprises a refluxed absorber. An embodiment of the invention is one, any or all of prior embodiments in this paragraph up through the first embodiment in this paragraph wherein the separation unit comprises a distillation column. An embodiment of the invention is one, any or all of prior embodiments in this paragraph up through the first embodiment in this paragraph wherein the recovered regeneration gas stream is combined with the product stream. An embodiment of the invention is one, any or all of prior embodiments in this paragraph up through the first embodiment in this paragraph wherein the natural gas stream passes through a filter coalescer before entering the adsorbent bed. An embodiment of the invention is one, any or all of prior embodiments in this paragraph up through the first embodiment in this paragraph wherein the recovered regeneration gas stream is sent through a chiller or condenser. An embodiment of the invention is one, any or all of prior embodiments in this paragraph up through the first embodiment in this paragraph wherein the chiller or condenser produces a liquid stream to be returned to the separation unit. An embodiment of the invention is one, any or all of prior embodiments in this paragraph up through the first embodiment in this paragraph wherein the liquid stream is sent to a reboiler to produce a liquid heavy hydrocarbon stream and a lighter gas stream. An embodiment of the invention is one, any or all of prior embodiments in this paragraph up through the first embodiment in this paragraph wherein the lighter gas stream is returned to the distillation column.

A second embodiment of the invention is a process for treating a natural gas stream comprising sending the natural gas stream through an adsorbent bed containing an adsorbent to remove C5, C6 and heavier hydrocarbons and producing a product gas stream comprising C1 to C4 hydrocarbons; regenerating the adsorbent bed by sending a regeneration gas stream through the adsorbent bed to produce a contaminated gas stream; cooling the contaminated gas stream; and sending a cooled contaminated gas stream to a reflux absorber or to a distillation column without chilling the cooled contaminated gas stream by a refrigeration means. An embodiment of the invention is one, any or all of prior embodiments in this paragraph up through the second embodiment in this paragraph wherein a recovered regeneration gas stream exits the reflux absorber or the distillation column. An embodiment of the invention is one, any or all of prior embodiments in this paragraph up through the second embodiment in this paragraph wherein the recovered regeneration gas stream is sent through a chiller or condenser to recycle a liquid stream. An embodiment of the invention is one, any or all of prior embodiments in this paragraph up through the second embodiment in this paragraph wherein the recovered regeneration gas stream is combined with the product gas stream.

The invention claimed is:

1. A process to treat a natural gas stream by removing heavier hydrocarbons comprising C5, C6 and heavier hydrocarbons, said process comprising:
    sending said natural gas stream through an adsorbent bed to remove said heavier hydrocarbons and producing a product stream comprising C1 to C4 hydrocarbons;
    sending a portion of said product stream through a regeneration heater to produce a heated regeneration gas stream;
    sending said heated regeneration gas stream through said adsorbent bed to desorb said heavier hydrocarbons; and
    cooling said regeneration gas stream and sending a cooled regeneration gas stream to a separation unit to divide said regeneration gas stream into a liquid stream comprising heavier hydrocarbons and a recovered regeneration gas stream, wherein said separation unit comprises a reflux absorber or a distillation column.

2. The process of claim 1 wherein said recovered regeneration gas stream is combined with said product stream.

3. The process of claim 1 wherein said natural gas stream passes through a filter coalescer before entering said adsorbent bed.

4. The process of claim 1 wherein said recovered regeneration gas stream is sent through a chiller or condenser.

5. The process of claim 4 wherein said chiller or condenser produces a liquid stream to be returned to said separation unit.

6. The process of claim 1 wherein said liquid stream comprising heavier hydrocarbons is sent to a reboiler of the distillation column to produce a liquid heavy hydrocarbon stream and a lighter gas stream.

7. The process of claim 6 wherein said lighter gas stream is returned to said distillation column.

8. A process for treating a natural gas stream comprising sending said natural gas stream through an adsorbent bed containing an adsorbent to remove C5, C6 and heavier hydrocarbons and producing a product gas stream comprising C1 to C4 hydrocarbons; regenerating said adsorbent bed by sending a regeneration gas stream through said adsorbent bed to produce a contaminated gas stream; cooling said contaminated gas stream; and sending a cooled contaminated gas stream to a reflux absorber or to a distillation column without chilling said cooled contaminated gas stream by a refrigeration means.

9. The process of claim 8 wherein a recovered regeneration gas stream exits said reflux absorber or said distillation column.

10. The process of claim 9 wherein said recovered regeneration gas stream is sent through a chiller or condenser to recycle a liquid stream.

11. The process of claim 9 wherein said recovered regeneration gas stream is combined with said product gas stream.

* * * * *